United States Patent [19]

Parker

[11] Patent Number: 4,772,113
[45] Date of Patent: Sep. 20, 1988

[54] LOW VISION EYE GLASSES

[76] Inventor: William S. Parker, 3120 Corrine Dr., Orlando, Fla. 32803

[21] Appl. No.: 777,829

[22] Filed: Sep. 19, 1985

[51] Int. Cl.⁴ .......................... G02C 7/08; G02C 7/06
[52] U.S. Cl. ....................................... 351/57; 351/170
[58] Field of Search .................. 351/57, 58, 59, 167, 351/177, 170, 175, 172

[56] References Cited

U.S. PATENT DOCUMENTS

| | | | |
|---|---|---|---|
| 968,693 | 8/1910 | Von Rohr | 351/167 |
| 2,092,789 | 9/1937 | Tillyer | 351/177 X |
| 3,027,803 | 4/1962 | Filderman | 351/57 |
| 3,702,218 | 11/1972 | Manhire | 351/167 |
| 4,581,031 | 4/1986 | Koziol et al. | 351/170 X |

OTHER PUBLICATIONS

Manufacturing Optician International, Double Spectacles, vol. 19, No. 11, pp. 630–632, 5/67.

Journal of American Optometric Assoc., Press-On Optics, 4/76, (pp. 434 & 435).

Primary Examiner—Rodney B. Bovernick
Attorney, Agent, or Firm—James H. Beusse

[57] ABSTRACT

Eye glasses are disclosed for improving the vision of people with macular degeneration, optic nerve damage or similar low vision problems. The glasses comprise two lens assemblies, each having a magnifying lens with two convex surfaces and a reducing lens with two concave surfaces. The reducing lens incorporates prism rings which focus an image or light onto an undamaged portion of the macular. A frame is employed for supporting each assembly at a predetermined distance from an eye of a user and for supporting the lenses assembly in a predetermined orientation with respect to each other with the lenses defining a fixed space therebetween. Also disclosed are the lenses themselves and the method of using them.

10 Claims, 2 Drawing Sheets

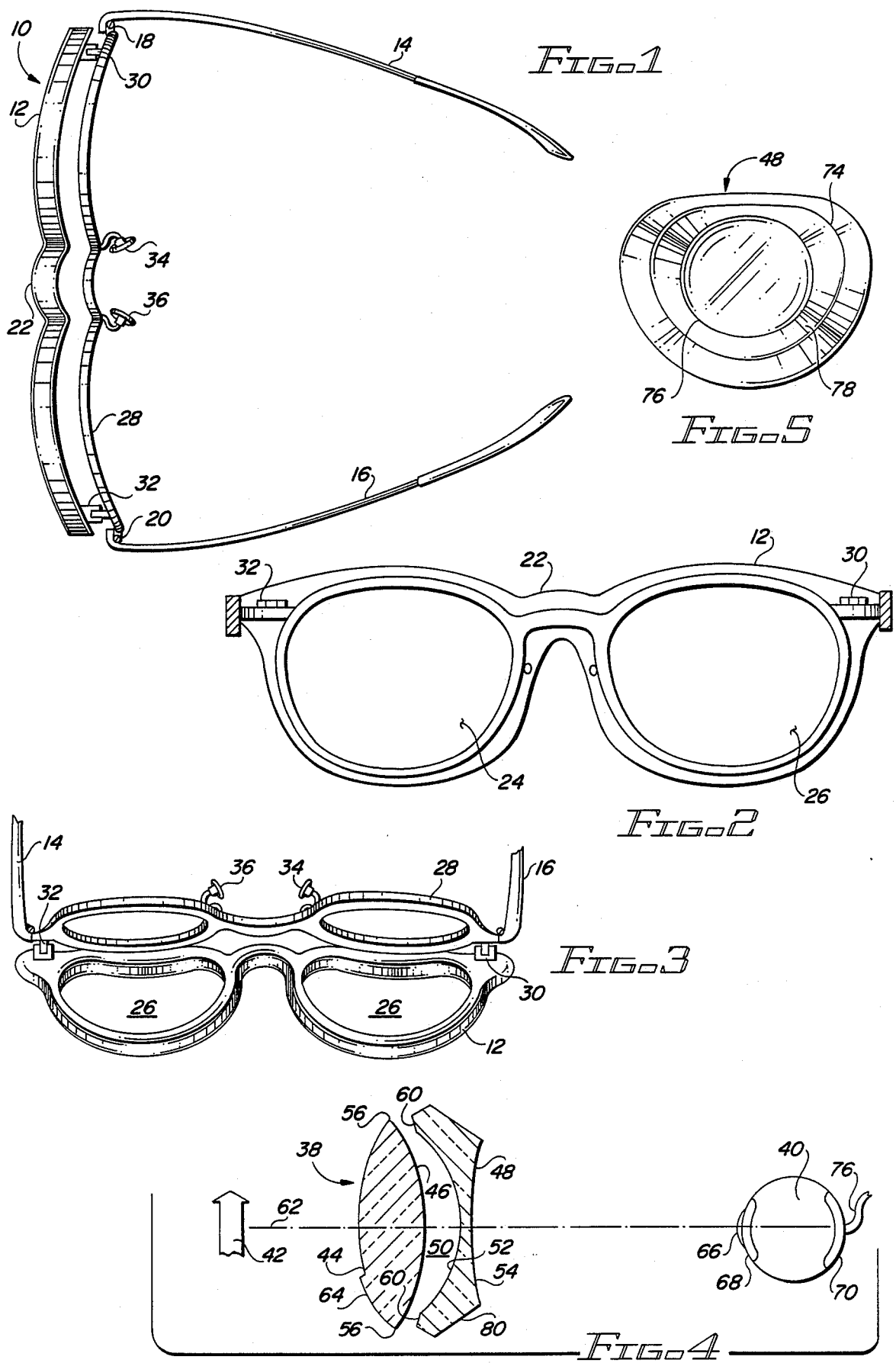

LOW VISION EYE GLASSES

BACKGROUND OF THE INVENTION

1. Field of the Invention

This invention relates to improved eye glasses for use by people with macular degeneration, optic nerve damage or similar low vision problems and; to the lens assemblies, per se, used in such eye glasses.

2. Description of the Prior Art

Various types of apparatus have been deviced for people with vision problems. The most common of such apparatus are eye glasses for helping people who have difficulty in focusing light rays of an object being viewed onto the macular retinal membrane on the rear of the eyeball. Inadequate focusing is not uncommon and is caused by the improper focusing by the cornea and lens of the eyeball. When the cornea and lens do not function to properly bend or refract the incoming, image-bearing light rays, such light rays are not properly focused upon the macular retinal membrane and, as a result, the optic nerves cannot convey the proper information to the brain to effect proper vision. Mechanical lenses can normally correct this type of vision problem. Such mechanical lenses normally take the form of contact lenses, eye glasses or the like and have been in common usage for many years.

When, however, faulty vision is caused either by the degeneration of the whole or a part of the macular retinal membrane on the back or interior face of the eyeball, or by the deterioration of the optic nerve which would normally carry the images from the macular retinal membrane to the brain, standard lenses themselves are insufficient to restore proper vision to the patient so afflicted. Surgery might be a solution. Alternatively, additional intensification of the light within the image pattern may in some cases effectively restore sight.

Various commercial devices for overcoming low vision problems have recently received commercial acceptance to varying degrees. One of these devices is the Finebloom System. The Finebloom System is constructed of tube-type devices consisting of mirrors that attach to a conventional pair of eye glasses. This apparatus allows a patient using such system to focus on objects at one particular distance. The mirrors of the tubes intensify the focused light to allow the degenerated macular retinal membrane, or degenerated part thereof, or the deteriorated optic nerve to function again to thereby effectively restore vision. Different tubes must be utilized for focusing at different distances. Unfortunately, such a system allows only about ten percent peripheral vision thus reducing the user to pinpoint or tunnel vision.

An additional low vision aid recently introduced to the commercial market is the Opticon System. This system consists of diverging contact lenses of a negative power used in optical cooperation with additional conventional converging lenses of a positive power. The positive lenses must be moved toward or away from the contact lenses and eye of the user to focus in a manner similar to a telescope. Patients utilizing such a system have a wider field of vision than they would experience with the Finebloom System, but magnification becomes a problem. Vertex distance, or distance from the contact lens of negative power to the front of the forward lens of positive power, creates a telescopic image much larger than normal size. This results in a depth perception problem for the user. Objects being viewed thus appear much closer than they really are. Further, as a practical matter, a great percentage of users of systems of this type are older and encounter problems applying and removing their contact lenses.

Various prior art disclosures described lens arrangements in combinations which have limited structural similarities to the lens arrangement of the present invention. The original telescope by Galileo, for example, utilized a negative power lens close to the eye of the user in optical combination with a positive power lens supported by a tube at fixed distance from the negative lens. In later telescopes, the distance could be varied by the user as a function of the distance to the object being viewed. In the telescope of the later type, unlike the lens system of the present invention, the distance between the functioning lenses varied. There was no specific provision for image intensification as would be needed for people with low vision problems as described above. Futhermore, the telescopes of Galileo, as well as of later types, were designed for magnifying rather than for achieving the effective one-to-one focusing which is the objective for normal eye glass use.

Other lens arrangements which utilize combined lenses of positive and/or negative characteristics are found in U.S. Pat. Nos. 2,474,837 to Glancy and 3,511,558 to Uberhagen. These disclosures are directed to apparatus for use as magnifiers as in telescopes or cameras, a totally different function than the present invention which seeks to retain a one-to-one imaging with increased illumination over a range of distances for correcting low vision problems. Even though structural similarities may exist between the present invention and these prior art devices, their structural dissimilarities preclude their use for the purposes of the present invention.

Additionally, other prior art disclosures which describe lens arrangements for eye glasses can be found in U.S. Pat. Nos. 968,693 to Rohr; 2,092,789 to Tillyer; 3,702,218 to Manhire; and 3,877,978 to Tolar. In all of these prior art disclosures, the lens assemblies are directed to combinations of lenses of varying shapes and powers to correct the problems a patient may have in focusing light rays onto the macular retinal membrane as caused by an improperly functioning cornea and lens. None of the prior art arrangements of lenses provides for the light intensifying capability to help patients who have low vision problems as caused by macular degeneration, optic nerve damage or the like. In most cases, these prior art patents describe lens arrangements which combine their positive and/or negative lenses together into a single lens. They therefore function as a single lens solely for the purpose of improving the focusing capabilities of the patient. Further, as discussed above, even though structural similarities may exist between the present invention and these prior art devices, their structural dissimilarities preclude their use for the purposes of the present invention.

Although many lenses and other optical devices in various combinations have been proposed in the past for overcoming a wide range of optical problems, none teaches the present inventive use of eye glasses having lenses of positive and negative powers, separated by a fixed air space and incorporating a prism for their purposes, objectives and advantages of overcoming macular degeneration, optic nerve damage and simlar low vision problems. The present invention overcomes the problems of the prior art and achieves its objectives and advantages with a minimum number of functioning parts and at a minimum of cost. The present invention also eliminates both the need for a patient to endure tunnel or pinpoint vision and eliminates the need for a patient to wear a bulky apparatus or one which would require constant readjustment for focusing. These objectives and advantages should be construed to be merely illustrative of some of the more prominent features and applications of the present invention. Many other beneficial results can be attained by applying the disclosed invention in a different manner or modifying the invention within the scope of the disclosure. Accordingly, other objects and advantages, as well as a fuller understanding of the invention, may be had by referring to the summary of the invention and the detailed description describing the preferred embodiments of the invention in addition to the scope of the invention as defined by the claims taken in conjunction with the accompanying drawings.

SUMMARY OF THE INVENTION

The present invention is defined by the appended claims with specific embodiments shown in the attached drawings. For the purposes of summarizing the invention, the invention may be incorporated into an optical system, for projecting light rays at essentially one-to-one magnification, comprising a first lens of positive optical characteristics, a second lens of negative optical characteristics incorporating a prism and means to fixedly secure the first lens and second lens with respect to each other. A space is formed between the lenses at least in their central regions. The first lens has at least one convex surface and, preferably, two convex surfaces. The second lens has at least one concave surface and, preferably, two concave surfaces. In one embodiment additional curvatures are provided on the periphery of the second lens whereby it may be placed in contact with the first lens at their peripheries. In this embodiment the optical system further includes an opthalmic cement for fusing the lenses to each other at their peripheries. The space between the lenses is between about 1.2 millimeters and about 1.5 millimeters. The first lens has an edge thickness of between about 0.5 millimeters and about 1.5 millimeters. The side of the first lens which is closer to the second lens has a convex surface with a curvature of between about 2.13 diopter and about 4.76 diopter. The second lens has a center thickness of between about 1.2 millimeters and about 1.6 millimeters. The side of the second lens which is closer to the first lens has a concave surface with a curvature of between about 4.29 diopter and about 6.72 diopter. In an alternate embodiment of the invention, a bifical lens is formed as part of the first lens.

The present invention also includes improved glasses for use by people with low vision problems such as macular degeneration, optic nerve damage or the like. The improved glasses comprise a lens assembly having a magnifying lens for converging received light and a reducing lens for diverging received light and a frame for supporting the lens assembly at a predetermined distance from an eye of a user and for suporting the lenses in a predetermined orientation with respect to each other with the lenses defining a space therebetween along the optical axes of the lenses. The space is for passing light rays projected between the lenses. The space between the lenses is between about 1.2 millimeters and about 5.0 millimeters. The edge of the magnifying lens has a thickness of between about 0.5 millimeters and about 1.5 millimeters. The side of the magnifying lens which is adjacent to the space has a convex surface with a curvature of between about 2.13 diopter and about 4.76 diopter. The reducing lens has a central thickness of between about 1.2 millimeters and about 1.6 millimeters. The side of the reducing lens adjacent to the space has a concave surface with a curvature of between about 4.29 diopter and about 6.72 diopter. In one form, the glasses further include additional curvatures on the periphery of the magnifying lens whereby the lenses may be placed in virtual contact with each other and cemented at their peripheries. In an alternate form of the invention, the glasses may further include a bifocal lens formed as part of the magnifying lens.

The present present invention may also be considered as comprising eye glasses for improving the vision of people with macular degeneration, optic nerve damage or similar low vision problems. Such eye glasses include two lens assemblies. Each assembly has a magnifying lens with two convex surfaces and an edge thickness of between about 0.5 millimeters and about 1.5 millimeters. Each assembly also has a reducing lens with two concave surfaces and a central thickness of between about 1.2 millimeters and about 1.6 millimeters. The lenses of each assembly are aligned along their optical axes. Sych eye glasses also include a frame for supporting each lens of each assembly at a predetermined distance from an eye of a user and for supporting the lenses of each assembly in a predetermined orientation with respect to each other. The lenses of each assembly define an air space of at least between about 1.2 millimeters and about 5.0 millimeters therebetween along their optical axes. For each assembly, the side of the magnifying lens which is adjacent to the space has a surface with a convex curvature of between about 2.13 diopter and about 4.76 diopter. For each assembly, the side of the reducing lens adjacent to the space has a surface with a concave curvature of between about 4.29 diopter and about 6.72 diopter.

The invention is described in one form as an optical system for focusing intensified light received from an object source onto optically responsive portions of a partially degenerated macular retinal membrane which is positioned along the inner surface of an eye. The system includes an outer positive lens for converging light received from the object source and an inner negative power lens, spaced apart from the outer positive lens and positioned between the outer lens and the eye. The inner lens selectively controls image direction to focus an image upon the optically responsive portions of the retinal membrane. The inner lens has an outer concave surface of a first diameter facing the outer lens and an inner concave surface of a second diameter smaller than the first diameter facing away from the outer lens. A prism ring circumscribes the inner lens and is oriented to refract light entering the lens toward an optical center of the inner lens.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed herein may be readily utilized as a basis for modifying or designing other structures for carrying out the same purposes of the present invention. It should also be realized by those skilled in the art that such equivalent constructions do not depart from the spirt and scope of the invention as set forth in the appended claims.

DESCRIPTION OF THE DRAWINGS

For a more complete understanding of the nature, objects and advantages of the present invention, reference should be had to the following detailed description taken in conjunction with the accompanying drawings in which:

FIG. 1 is a top view of a lens frame assembly for utilizing the lenses of the present invention;

FIG. 2 is a rear view of the lens frame assembly of FIG. 1;

FIG. 3 is a bottom view of the lens frame assembly of FIG. 1 showing the hinging action of the assembly;

FIG. 4 is a cross-sectional view of one form of the inventive lens assembly; and FIG. 5 is a planar view of an inventive convex lens forming a part of the present invention.

DETAILED DESCRIPTION OF THE INVENTION

Shown in the drawings, FIGS. 1, 2 and 3, is an eye glass frame assembly 10 for supporting the inventive lens assemblies and for improving the vision problems of patients suffering from low vision problems such as macular degeneration, optic nerve damage or the like. The frame assembly includes a standard lens support frame or rim 12 for rigidly holding a magnification lens in proper orientation with respect to an eye of a user of such eye glasses. The rim 12 is preferably plastic so as to have low weight while providing massive support. The interior surface of rim 12 is provided with a groove in a manner well known in the art formed as an inset ledge adapted to receive the edges of a lens for maintaining it in a desired position. The frame assembly also includes elongated side stems 14 and 16 terminating in downturned arms for positioning behind the ears of a user for securing the glasses on the head of the user so as to hold the frames and, consequently, the lens assemblies, in proper orientation with respect to the eyes of a user. Hinges 18 and 20 are preferably provided at the forward ends of the stems adjacent the rims to permit the folding of the parts of the eye glasses into a compact arrangement when not in use. A bridge 22 couples two lens openings 24 and 26 across the nose of a user. In such manner, the optical axes of a lens held in the frame assembly 10 normally coincides with the optical axes of the eyeballs of a user so that the object being viewed are usually aligned in a predetermined orientation for proper vision.

The frame assembly 10 also includes an inner frame 28 for holding a second pair of lenses in a predetermined position with respect to the lenses held in frame 12. The frame 28 is also of a type well known in the art and preferably comprises a wire frame having low mass so that the combined size of frames 12 and 18 is maintained relatively small. As can be seen in the view of FIG. 1, frame 12 is hinged to frame 28 by hinges 30 and 32 which allows the frame 12 to pivot as much as five millimeters with respect to frame 28. FIG. 3 shows the pivoted frames. As will become apparent from the discussion to follow, one of the innovative features of this system is the combination of a prism effect into the inventive lenses so that the viewed image may be focussed onto a particular area of a retina. In some patients, e.g., diabetic patients, that portion of a retina which is responsive to light may vary from day-to-day. By providing a slight adjustment of the relative positions of the frame 12 and 28, the position of the focussed image may be varied. So long as the optical centers of the lenses are not effected, the image will not deteriorate. The inner frame 28 also includes nose pieces 34 and 36 for supporting the frame assembly 10 on the nose of a user in the well known manner.

One form of lens assembly is shown in FIG. 4, a sectional view. In this form the outer and inner lenses may be adhesively joined and held in a single frame (not shown) rather than in the preferred dual frame assembly 10. The first or outer lens 38, that lens most distant from the eye 40 of the user, is of a positive power or positive optical characteristics and functions as an enlarging lens for each optical system. Such a lens will function to converge light rays received from an object 42 being viewed. In the preferred embodiment of the invention, this lens is formed with two convex surfaces, one at its front or outer side 44 and one at its back or inner side 46. Normally, for a positive lens, at least one surface of the lens must be convex. This lens is of sufficient size to effect its appropriate imaging function with its edge thickness being between about 0.5 millimeters and about 1.5 millimeters. Its inner side 46, that side closer to the eye of a user, to the second lens 48 and to the space 50 between the lenses, preferably has a convex surface with a curvature of between about 2.13 diopter and about 4.76 diopter. A diopter is a unit of measurement of the refractive power of a lens equal to the reciprocal of its focal length measured in meters.

The second lens 48 of each optical system is of a negative power or negative optical characteristics and functions to reduce the image being viewed by diverging received light rays. This lens is preferably formed with two concave surfaces, one at its front or outer side 52 and one at its back or inner side 54. This lens preferably is of sufficient size and has a center thickness of between about 1.2 millimeters and about 1.6 millimeters. The curvature of the first or outer side 52 of the second lens 48, that lens remote from the eye of the user and closer to both the first lens and the space 50 between the lenses, preferably has a curvature of between 4.29 diopter and about 6.72 diopter.

The various lenses of the optical assemblies are preferably formed of glass or plastic of commercial quality and performance characteristics. Such materials are well known in the art, readily available in the market place and are fully described in the published literature.

In the embodiment of FIG. 4, these first and second lenses may be secured together in virtual physical contact around their peripheries 56, preferably with an opthalmic cement to form a lens assemblies. The opthalmic cement precludes any deterioration of the optical characteristics of the projected images because of its inherent transparency and because of the thinness of the layer normally employed for coupling or fusing of the lenses together.

In order to maintain the proper curvature of the lenses in their greater or central extent 58 of the lenses, and yet permit the cementing of the lenses together, the periphery of one of the lenses, preferably the second lens 48, is provided with additional areas 60 on its front or outer surface 52. These additional areas will allow the smooth contact of the lenses at their peripheries while still maintaining the proper spacing and air space between lenses 38 and 48.

The space 50 between the lenses along their optical axes 62 is between about 1.2 millimeters and about 1.5 millimeters. When the image-bearing light rays from the object being viewed are converged by the first lens 38, the light enters the space 50, a region with a lower index of refraction. Such light rays are then diverged and scattered during their passage through the second lens 48. The passage of light through the space between the lenses acts with the lenses on either side in intensifying the light projected to the eye 40 of a user of the system. The lens assembly is designed and configured so as to produce an essentially one-to-one magnification which is preferred for eye glass usage.

While the above description is principally directed to the lens assembly or system including certain lenses and a space between them to improve the low vision problems of a user, the invention should also be construed as including the eye glasses in combination with the lens assemblies for supporting two such assemblies with the lenses of each assembly in proper orientation with respect to each other and also in proper orientation with respect to the eyes of a user.

FIG. 4 also illustrates, added to the first lens 38, preferably on its outer or front surface 58, a bifocal lens 64. The bifocal lens is designed of a proper prescription and is located or disposed at the bottom of the front of the first lens adjacent the front of the rim. It constitutes a minor extent of the lens surface. This bifocal lens functions in a normal fashion as the standard bifocal lens permitting a user to read at close distances by viewing therethrough as well as at far distances when viewing through the major extent of the lenses. Bifocals, as well as their methods of fabrication and use, are well known in the art. In addition to the normal bifocal function, eye glasses with bifocal lenses constructed in accordance with the present invention provide the image intensification functions for people with low vision problems as described hereinabove.

During the passage of the image-bearing light rays into the eye of a patient, such rays will pass through the lens 66 and cornea 68 of the eyeball 40 of the patient using the present inventive apparatus. Such light rays will thus be focused onto the macular retinal membrane 70, a central portion of the retina. From there, the optic nerve 76 will convey the light rays as nerve impulses to the brain to complete the viewing process. Low vision problems such as macular degeneration, optic nerve damage and the like may be correctable without surgery if the image-bearing light rays are sufficiently intensified so as to adequately stimulate the degenerated macular retinal membrane, or to focus images on remaining portions of the macular retinal membrane 70 which are not degenerated. The present invention with its inventive arrangement of lenses, prisms and contained air space provides such light intensification and focusing whereby such low vision problems may be readily overcome most conveniently for a wide range of patients.

Referring to FIG. 5, there is shown a front view of the inner lens 48 of the present invention. The outer line 74 represents the beginning edge of the outer concave surface 52. The inner line 76 represents the beginning edge of the inner concave surface 54. The relative difference in diameter of the outer and inner concave surfaces 52 and 54 defines a prism surface or circular refractive interface 78 which is actually a reflection of the surface 80 (see FIG. 4). The prism surface 78 enhances the light gathering ability of lens 48 and brightens images directed to the eye. By shifting the relative position of the surfaces 52 and 54 and varying their relative size, the image can be focused on areas of the retinal membrane 70 which are active or undamaged, i.e., the optical center of a lens 48 can be shifted to change the focal area on the eye. Preferably the diameter of the inner concave surface 54 is maintained constant while the diameter of the outer concave surface 52 may be varied as required. Typically, the surface 54 will have a diameter of 35 millimeters while the diameter of surface 52 may vary between 38 and 50 millimeters. Variation of one millimeter in the size of the defined prism surface will shift the image by five degrees angularly with respect to the optical axis of the lenses.

In fitting lenses of a system constructed in accordance with the present invention, the first or magnifying lens 38, as well as the second or diverging lens 48, of proper prescription are designed to the imaging needs of the user. The first lens can be moved forward and backward during the fitting process to effectively focus the image to the needs of the patient in a manner similar to a zoom lens on a camera. When the image being viewed is being focused to a particular patient's needs and objects can be viewed clearly, this information is used to prepare a lens assembly. By computing the distance from the first lens 38 to the second lens 48, times the power of the first lens, with correct power and lens curvature, both lenses can be secured with respect to each other and fused together to form the final lens system or can be positioned in a frame assembly such as that shown in FIGS. 1–3. It is understood that for some conditions that the optical axes of the patient's lenses may have to be slightly offset from the optical axis of the eye of the patient for proper fitting. This is to accommodate a patient's pupillary distance. Such a situation is deemed to fall within the purview of the present invention and the present invention may readily be utilized under such condition.

In addition to the apparatus as described above, the present invention also includes the method of improving the vision of a patient who is suffering from low vision problems such as macular degeneration, optic nerve damage, or the like. The method not only includes the steps of focusing the image being viewed, but also includes the step of intensifying the focused light on the macular retinal membrane which will effectively restore vision to a user. The method first includes the step of converging the image-bearing light rays as they are projected from the object 42 being viewed by the use of a positive power lens 38 tending to magnify the image. This lens will also project the converged light rays toward the eye of the patient, the viewer. Prior to the passage of the light rays to the eye 40 of the user, the projected light rays pass through an air space 50 and second lens 48.

At the second lens 48, the received light rays are diverged through the negative power of the second lens 48 and such light rays are then projected into the eye 20 of the user of the apparatus by virtue of the prism surface 78. This method also includes the step of maintaining the positive and negative lenses at a fixed space from each other as through fusion by an opthalmic cement with an appropriate air space therebetween or by being held in a double frame assembly 10. The method also includes the step of maintaining each of the lenses at a fixed predetermined distance from the eye 40 of the user of the apparatus regardless of the distance to the object 42 being viewed.

The present disclosure includes that information contained in the appended claims as well as that in the foregoing description. Although the invention has been described in its preferred forms or embodiments with a certain degree of particularity, it is understood that the present disclosure of the preferred forms has been made only by way of example and that numerous changes in the details of construction, fabrication and use, including the combination and arrangement of parts and steps, may be resorted to without departing from the spirit and scope of the invention.

What is claimed is:

1. A pair of spectacles for focusing intensified light received from an object source onto optically responsive portions of a partially degenerated macular retinal membrane which is positioned along the inner surface of an eye, said spectacles comprising:
   an outer positive lens for converging light received from the object source; and
   an inner negative power lens, spaced apart from said outer positive lens and positioned between said outer lens and the eye, said inner lens selectively controlling image direction to focus an image upon the optically responsive portions of the retinal membrane, said inner lens having an outer concave surface of a first diameter facing said outer lens and an inner concave surface of a second diameter smaller than said first diameter facing away from said outer lens; and
   a prism ring circumscribing said inner lens and oriented to refract light entering said lens toward an optical center of said inner lens.

2. The optical system as set forth in claim 1 wherein said outer lens has two convex surfaces.

3. The optical system as set forth in claim 1 wherein the space between said lenses is between about 1.2 millimeters and about 1.5 millimeters.

4. The optical system of claim 1 wherein said inner lens is circular and said prism comprises a refractive surface formed along said inner lens by selecting a greater diameter for the outer concave surface than for the inner concave surface.

5. The optical system of claim 4 further comprising:
   a frame for supporting said inner and outer lenses at a predetermined distance from an eye of a user and for supporting said inner and outer lenses in a predetermined orientation with respect to each other with said lenses defining a space therebetween at least along the optical axes of the lenses for dispersing light rays projected between said inner and outer lenses.

6. The optical system as set forth in claim 5 wherein the space between said lenses is between about 1.2 millimeters and about 1.5 millimeters.

7. The optical system as set forth in claim 5 wherein said frame includes a first frame member for supporting said outer lens and a second frame member for supporting said inner lens, said first and second frame members being attached for relative pivoting movement.

8. The optical system as set forth in claim 4 wherein said outer lens has an edge thickness of between about 0.5 millimeters and about 1.5 millimeters.

9. The optical system as set forth in claim 4 wherein said inner lens has a center thickness of between about 1.2 millimeters and about 1.6 millimeters.

10. The optical system as set forth in claim 4 and further including a bifocal lens formed as part of said outer lens.

* * * * *